United States Patent
Kasahara

(10) Patent No.: US 8,590,291 B2
(45) Date of Patent: Nov. 26, 2013

(54) CONTROL DEVICE OF REDUCING AGENT SUPPLY APPARATUS, REDUCING AGENT COLLECTION METHOD, AND EXHAUST GAS PURIFICATION APPARATUS

(75) Inventor: Hiroyuki Kasahara, Saitama (JP)

(73) Assignee: Bosch Corporation, Tokyo (JP)

( * ) Notice: Subject to any disclaimer, the term of this patent is extended or adjusted under 35 U.S.C. 154(b) by 352 days.

(21) Appl. No.: 12/921,276

(22) PCT Filed: Oct. 14, 2008

(86) PCT No.: PCT/JP2008/068527
§ 371 (c)(1),
(2), (4) Date: Sep. 7, 2010

(87) PCT Pub. No.: WO2009/110130
PCT Pub. Date: Sep. 11, 2009

(65) Prior Publication Data
US 2011/0000196 A1    Jan. 6, 2011

(30) Foreign Application Priority Data
Mar. 7, 2008    (JP) .................................. 2008-057323

(51) Int. Cl.
*F01N 3/00*    (2006.01)
(52) U.S. Cl.
USPC .................... 60/286; 60/295; 60/301; 60/303
(58) Field of Classification Search
USPC ............ 60/274, 277, 286, 295, 297, 301, 303
See application file for complete search history.

(56) References Cited

U.S. PATENT DOCUMENTS

| 5,884,475 | A | 3/1999 | Hofmann et al. | |
| 7,685,810 | B2 * | 3/2010 | Hirata et al. | 60/277 |
| 7,703,276 | B2 * | 4/2010 | Ueno | 60/286 |
| 7,726,118 | B2 * | 6/2010 | Oberski et al. | 60/286 |
| 7,793,491 | B2 * | 9/2010 | Esaka | 60/286 |
| 8,161,735 | B2 * | 4/2012 | Kitazawa | 60/295 |
| 8,256,211 | B2 | 9/2012 | Asaura et al. | |

FOREIGN PATENT DOCUMENTS

| JP | 9511807 A | 11/1997 |
| JP | 2006051017 | 2/2006 |
| JP | 2006122878 A | 5/2006 |
| JP | 2006132384 A | 5/2006 |

\* cited by examiner

*Primary Examiner* — Binh Q Tran
(74) *Attorney, Agent, or Firm* — Michael Best & Friedrich LLP

(57) ABSTRACT

A control device for a reducing agent supply apparatus for controlling the reducing agent supply apparatus having reducing agent collecting means for collecting a reducing agent inside reducing agent supply paths in an exhaust gas purification apparatus that adds the reducing agent to an exhaust gas upstream side of a reducing catalyst disposed inside an exhaust gas passageway of an internal combustion engine, and reduces and purifies nitrogen oxides contained in exhaust gas using the reducing catalyst, includes: a stop detection portion that detects when the internal combustion engine stops; a reducing agent collecting means control portion that starts collection of the reducing agent inside the reducing agent supply paths when the internal combustion engine stops; and an injection valve control portion that keeps a reducing agent injection valve closed when the reducing agent collecting means starts operating and opens the reducing agent injection valve after a predetermined time period elapses.

8 Claims, 8 Drawing Sheets

CONTROL DEVICE OF REDUCING AGENT SUPPLY APPARATUS, REDUCING AGENT COLLECTION METHOD, AND EXHAUST GAS PURIFICATION APPARATUS

TECHNICAL FIELD

The present invention relates to a control device of a reducing agent supply apparatus, a reducing agent collection method, and an exhaust gas purification apparatus. The invention particularly relates to a control device of a reducing agent supply apparatus that includes reducing agent collecting means for collecting a reducing agent inside reducing agent supply paths, a reducing agent collection method, and an exhaust gas purification apparatus that includes the control device.

BACKGROUND ART

In exhaust gas discharged from an internal combustion engine such as a diesel engine, nitrogen oxides (hereinafter referred to as "$NO_x$") that may affect the environment are included. In known art, as an exhaust gas purification apparatus used for purifying the $NO_x$, a SCR (Selective Catalytic Reduction) system is known. The SCR system adds a reducing agent, such as urea aqueous solution, into the exhaust gas, and selectively reduces and purifies the $NO_x$ in a reducing catalyst.

The urea aqueous solution used in the SCR system as a reducing agent has a characteristic in which the solution crystallizes after the solvent is evaporated, when the solution is placed at a predetermined temperature range or left for a long time. Further, there is also a possibility that the urea aqueous solution becomes frozen when it is cold. When the reducing agent solidifies inside reducing agent supply paths, a supply of the reducing agent into an exhaust gas passageway becomes insufficient, and reduction and purification of the $NO_x$ in the reducing catalyst do not progress sufficiently. Thus, there is a concern that unpurified $NO_x$ may be discharged into the air.

Then, an exhaust gas purification apparatus that has made the reducing agent supply paths less likely to be clogged has been proposed. More specifically, as shown in FIG. 8, the exhaust gas purification apparatus that has been disclosed includes pressure lowering means (a pressure regulator 338) for lowering pressure inside an upper space of a reducing agent container (a storage tank) 324 at least to atmospheric pressure, when it is determined, by operation determination means for determining an engine operating condition, that an engine is stopped. When the engine is stopped, the exhaust gas purification apparatus is structured such that the reducing agent existing in the reducing agent supply paths is reliably collected into the reducing agent container 324 (Patent Document 1).

Patent Document 1: JP-A-2006-132384 (claim 4, Paragraph [0021], FIG. 2)

DISCLOSURE OF THE INVENTION

Problems that the Invention is to Solve

Here, as described in Patent Document 1, when the reducing agent is collected into the storage tank by lowering pressure inside the reducing agent supply paths, it is necessary to keep a reducing agent injection valve open, such that the reducing agent inside the reducing agent supply paths is reliably collected. However, if the reducing agent injection valve is opened at the same time as, or before starting, lowering the pressure inside the reducing agent supply paths, there is a possibility that the reducing agent may leak into the exhaust gas passageway. Namely, since the pressure is high inside the reducing agent supply paths just after starting to lower the pressure inside the reducing agent supply paths, if the reducing agent injection valve is opened, the reducing agent leaks into the exhaust gas passageway, due to the pressure inside the reducing agent supply paths. The reducing agent that has leaked into the exhaust gas passageway may attach to an inner surface of the exhaust gas passageway and may solidify, or cause the reducing catalyst wet. As a result, there is a possibility that it may cause functional deterioration of the SCR system and wasteful consumption of the reducing agent.

Therefore, the inventor of the invention has made a dedicated effort and has completed the invention by discovering that this type of problem can be solved by controlling the reducing agent injection valve to be closed when the reducing agent collecting means starts operating and to be opened when a predetermined time period elapses after the start of the operation. Namely, the object of the invention is to provide a control device of a reducing agent supply apparatus, a reducing agent collection method, and an exhaust gas purification apparatus that can prevent the reducing agent from leaking into an exhaust gas passageway when performing control for the collection of the reducing agent inside reducing agent supply paths.

Means for Solving the Problems

According to the invention, the above-mentioned problem can be solved by providing a control device for a reducing agent supply apparatus for controlling the reducing agent supply apparatus having reducing agent collecting means for collecting a reducing agent inside reducing agent supply paths in an exhaust gas purification apparatus that adds the reducing agent to an exhaust gas upstream side of a reducing catalyst disposed inside an exhaust gas passageway of an internal combustion engine, and reduces and purifies nitrogen oxides contained in exhaust gas using the reducing catalyst, the control device comprising: a stop detection portion that detects when the internal combustion engine stops; a reducing agent collecting means control portion that starts collection of the reducing agent inside the reducing agent supply paths when the internal combustion engine stops; and an injection valve control portion that keeps a reducing agent injection valve closed when the reducing agent collecting means starts operating and opens the reducing agent injection valve after a predetermined time period elapses.

Further, when the control device of the reducing agent supply apparatus according to the invention is structured, it is preferable that the injection valve control portion opens the reducing agent injection valve when pressure inside the reducing agent supply paths becomes equal to or less than a predetermined standard value.

Further, when the control device of the reducing agent supply apparatus according to the invention is structured, it is preferable that the injection valve control portion opens the reducing agent injection valve when an elapsed time period after the collection of the reducing agent starts passes a preset standard time period.

Further, when the control device of the reducing agent supply apparatus according to the invention is structured, it is preferable that the reducing agent injection valve is intermittently opened, when a valve opening operation of the reducing agent injection valve is performed after the predetermined time period elapses.

Further, another aspect of the invention is a reducing agent collection method for collecting a reducing agent inside reducing agent supply paths into a storage tank when an internal combustion engine is stopped in an exhaust gas purification apparatus that adds the reducing agent to an exhaust gas upstream side of a reducing catalyst disposed inside an exhaust gas passageway of an internal combustion engine and reduces and purifies nitrogen oxides contained in exhaust gas using the reducing catalyst, the reducing agent collection method comprising: starting operation of a reducing agent collecting means with a reducing agent injection valve closed when the internal combustion engine stops, and opening the reducing agent injection valve after a predetermined time period elapses.

Further, yet another aspect of the invention is an exhaust gas purification apparatus that adds a reducing agent to an exhaust gas upstream side of a reducing catalyst that is disposed inside an exhaust gas passageway of an internal combustion engine and reduces and purifies nitrogen oxides contained in exhaust gas using the reducing catalyst. The exhaust gas purification apparatus includes a storage tank in which the reducing agent is stored, pressure feed means for pressure feeding the reducing agent inside the storage tank, a reducing agent injection valve that controls injection of the pressure fed reducing agent, reducing agent collecting means for collecting the reducing agent remaining inside a path from the storage tank to the reducing agent injection valve into the storage tank when the internal combustion engine is stopped, and a reducing agent injection valve control portion that starts operating the reducing agent collecting means with the reducing agent injection valve closed and opens the reducing agent injection valve when a predetermined time period elapses.

Advantage of the Invention

According to the control device of the reducing agent supply apparatus of the invention, since the reducing agent injection valve is controlled to be closed when the reducing agent collecting means starts operating and to be opened when the predetermined time period elapses, the reducing agent injection valve is opened in a state in which the pressure inside the reducing agent supply paths is sufficiently lowered. Therefore, leakage of the reducing agent from the reducing agent injection valve into the exhaust gas passageway is decreased, crystallization of the reducing agent inside the exhaust gas passageway and moistening of the reducing catalyst by the reducing agent are prevented, and the wasteful consumption of the reducing agent is curbed.

Further, in the control device of the reducing agent supply apparatus of the invention, as the timing of opening the reducing agent injection valve is delayed, the reducing agent injection valve is opened after it is confirmed that the pressure inside the reducing agent supply paths is lowered, since an injection valve control portion opens the reducing agent injection valve only after the pressure inside the reducing agent supply paths becomes equal to or less than a standard value.

Further, in the control device of the reducing agent supply apparatus of the invention, as the timing of opening the reducing agent injection valve is delayed, even when a pressure sensor is not used, the reducing agent injection valve is opened in a state in which the pressure inside the reducing agent supply paths is sufficiently lowered, since the injection valve control portion opens the reducing agent injection valve only after an elapsed time period after the reducing agent collecting means starts operating exceeds a standard time period.

Further, according to the reducing agent collection method of the invention, since the reducing agent injection valve is controlled to be closed when the reducing agent collecting means starts operating and to be opened when the predetermined time period elapses, the reducing agent injection valve is opened in a state in which the pressure inside the reducing agent supply paths is sufficiently lowered. Therefore, leakage of the reducing agent from the reducing agent injection valve into the exhaust gas passageway is decreased, crystallization of the reducing agent inside the exhaust gas passageway and moistening of the reducing catalyst by the reducing agent are prevented, and the wasteful consumption of the reducing agent is curbed.

Further, according to the exhaust gas purification apparatus of the invention, the reducing agent inside the reducing agent supply paths is collected into the storage tank without the reducing agent leaking into the exhaust gas passageway when the internal combustion engine stops. Therefore, crystallization of the reducing agent inside the exhaust gas passageway and moistening of the reducing catalyst by the reducing agent are prevented, the exhaust gas purification efficiency degradation is presented, and the wasteful consumption of the reducing agent is curbed.

BEST MODE FOR CARRYING OUT THE INVENTION

Figure 1:
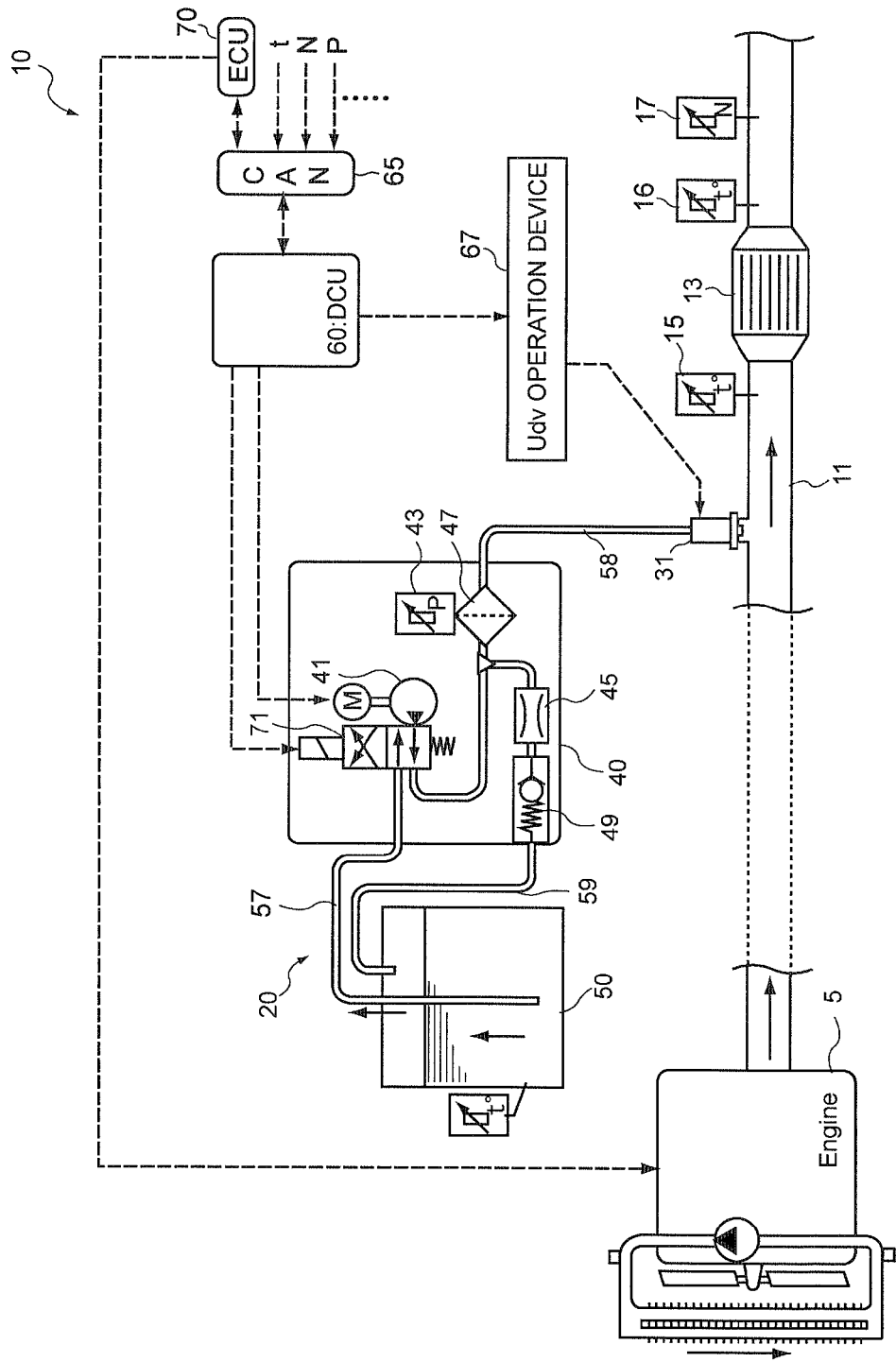
FIG. 1 is a diagram showing a structural example of an exhaust gas purification apparatus according to a first embodiment of the invention.

With reference to the figures, a control device of a reducing agent supply apparatus, a reducing agent collection method, and an exhaust gas purification apparatus according to the invention will be described in concrete terms below. However, note that embodiments described below only show an aspect of the invention without limiting the invention, and the embodiments can be modified as chosen within the scope of the invention.

Note that, in each figure, portions with the same reference characters illustrate the same portions, and thus related description will be omitted as appropriate.

[First Embodiment]

An exhaust gas purification apparatus according to a first embodiment of the invention is an exhaust gas purification apparatus in which a reducing agent injection valve is controlled to be opened when a pressure value inside reducing agent supply paths is equal to or less than a predetermined standard value, the pressure value inside the reducing agent supply paths being compared with the predetermined standard value after start of operation of reducing agent collecting means.

1. Overall Structure of Exhaust Gas Purification Apparatus

First, an example of an overall structure of the exhaust gas purification apparatus according to the embodiment will be described with reference to FIG. 1.

An exhaust gas purification apparatus 10 shown in FIG. 1 is an exhaust gas purification apparatus in which urea aqueous solution is used as a reducing agent, and after mixing and dispersing the reducing agent into exhaust gas, $NO_x$ in the exhaust gas is selectively reduced by passing the exhaust gas through a reducing catalyst 13. The exhaust gas purification apparatus 10 includes the reducing catalyst 13 that selectively reduces the $NO_x$ in the exhaust gas and that is provided in an exhaust gas passageway through which passes the exhaust gas that is discharged from an internal combustion engine 5, and a reducing agent supply apparatus 20 that adds the reducing agent into the exhaust gas passageway on the upstream side of the reducing catalyst 13. Further, temperature sensors 15 and 16 are disposed respectively on the upstream side and the downstream side of the reducing catalyst 13 provided in the exhaust gas passageway, and a $NO_x$ sensor 17 is disposed on the downstream side of the reducing catalyst 13. Among these, structures of the reducing catalyst 13, the temperature sensors 15 and 16 and the $NO_x$ sensor 17 are not particularly limited, and known structures are used.

The reducing agent supply apparatus 20 includes a reducing agent injection valve 31 that is fixed to an exhaust gas passageway 11 on the upstream side of the reducing catalyst 13, a storage tank 50 in which the reducing agent is stored, a pump module 40 that includes a pump 41 which pressure feeds the reducing agent inside the storage tank 50 to the reducing agent injection valve 31, and a control device (hereinafter referred to as "DCU: Dosing Control Unit") 60 that performs control of the reducing agent injection valve 31 and the pump 41 in order to control an injection amount of the reducing agent added into the exhaust gas passageway. Further, the storage tank 50 and the pump module 40 are connected by a first supply path 57, the pump module 40 and the reducing agent injection valve 31 are connected by a second supply path 58, and further, the pump module 40 and the storage tank 50 are connected by a return flow path 59.

Further, in an example of the exhaust gas purification apparatus 10 shown in FIG. 1, the DCU 60 is connected to a CAN 65. The CAN 65 is also connected to a control unit (hereinafter referred to as "ECU: Electronic Control Unit") 70 which controls an operating state of the internal combustion engine, and not only information regarding the operating state of the internal combustion engine, such as a fuel injection amount, an injection timing, a rotational frequency etc., but also information regarding all sensors etc. that are provided in the exhaust gas purification apparatus 10 are written into the CAN 65. Further, the DCU 60 connected to the CAN 65 reads the information on the CAN 65, and the DCU 60 is also able to output information on the CAN 65.

Note that, in the embodiment, the ECU 70 and the DCU 60 are formed of separate control units, and they are able to exchange information with each other via the CAN 65. However, the ECU 70 and DCU 60 may be formed as a single control unit.

As the reducing agent injection valve 31, for example, an ON-OFF valve that controls an ON-OFF state of valve opening is used. The reducing agent that is pressure fed from the pump module 40 to the reducing agent injection valve 31 is maintained at a predetermined pressure, and the reducing agent is injected into the exhaust gas passageway while the reducing agent injection valve 31 is opened through energization control by a reducing agent injection valve operation device (referred to as "Udv operation device" in FIG. 1) 67.

Further, the pump module 40 includes the pump 41. The pump 41 pumps up the reducing agent inside the storage tank 50 via the first supply path 57, and pressure feeds the reducing agent to the reducing agent injection valve 31 via the second supply path 58. The pump 41 is, for example, an electrically powered diaphragm pump, and the pump 41 is energization controlled by a signal output from the DCU 60. Further, the second supply path 58 that connects the pump 41 and the reducing agent injection valve 31 includes a pressure sensor 43, and a sensor value of the pressure sensor 43 is output to the DCU 60 as a signal. Based on the sensor value of the pressure sensor 43, a drive duty of the pump 41 is controlled to maintain a pressure value inside the second supply path 58 at a predetermined value. Namely, when the pressure inside the second supply path 58 is below the predetermined value, the pump 41 is controlled to make the drive duty bigger. In contrast, when the pressure inside the second supply path 58 exceeds the predetermined value, the pump 41 is controlled to make the drive duty smaller.

Note that the term "drive duty of the pump" means a percentage of time accounted for by pump driving time in one cycle of PWM (pulse width modulation) control.

Further, the second supply path 58 includes a main filter 47, and foreign matter contained in the reducing agent that is pressure fed to the reducing agent injection valve 31 is collected by the main filter 47. The return flow path 59 is branched from and provided on the second supply path 58 between the main filter 47 and the pump 41, and the return flow path 59 is connected to the storage tank 50. An orifice 45 is provided on the return flow path 59, and a pressure control valve 49 is provided on the return flow path 59 on the side closer to the storage tank 50 than the orifice 45. Since the reducing agent supply apparatus 20 includes this kind of return flow path 59, in a state in which the reducing agent is being pressure fed by the pump 41 that is feedback controlled based on the sensor value of the pressure sensor 43, when the pressure value inside the second supply path 58 exceeds the predetermined value, the pressure control valve 49 is opened and a part of the reducing agent is returned back into the storage tank 50. For the pressure control valve 49, for example, a known check valve etc. is used.

Further, the pump module 40 includes a reverting valve 71, and, through driving the pump 41 when the internal combustion engine is stopped, the reducing agent inside the reducing agent supply paths, including the pump module 40, the reducing agent injection valve 31, the first supply path 57, and the second supply path 58, is collected into the storage tank 50. Therefore, under a condition with a temperature that is likely to freeze the reducing agent, such as when it is cold, freezing of the reducing agent inside the reducing agent supply paths is prevented, or crystallization of the reducing agent inside the reducing agent supply paths is prevented in such a case in which control of the reducing agent supply apparatus 20 is not performed for a long time after stopping the internal combustion engine 5. As a result, when operation of the internal combustion engine is restarted, an occurrence of an injection failure caused by clogging of the reducing agent supply paths is inhibited.

The reverting valve 71 is, for example, a switch valve that has a function of switching a flow path of the reducing agent from a forward direction oriented from the storage tank 50 to the pump module 40 to a backward direction oriented from the pump module 40 to the storage tank 50. When an ignition switch of the internal combustion engine is turned off, through switching the flow path to the backward direction using the reverting valve 71, the reducing agent remaining in the reducing agent supply paths is collected into the storage tank 50.

2. Control Device of Reducing Agent Supply Apparatus

The DCU 60, which is provided in the exhaust gas purification apparatus 10 shown in FIG. 1, basically transmits a control signal of the pump 41 and of the reducing agent injection valve 31, based on various pieces of information existing on the CAN 65, to supply an appropriate amount of the reducing agent into the exhaust gas passageway 11. Further, the DCU 60 has a function as a control device to perform control of the collection of the reducing agent.

Figure 2:
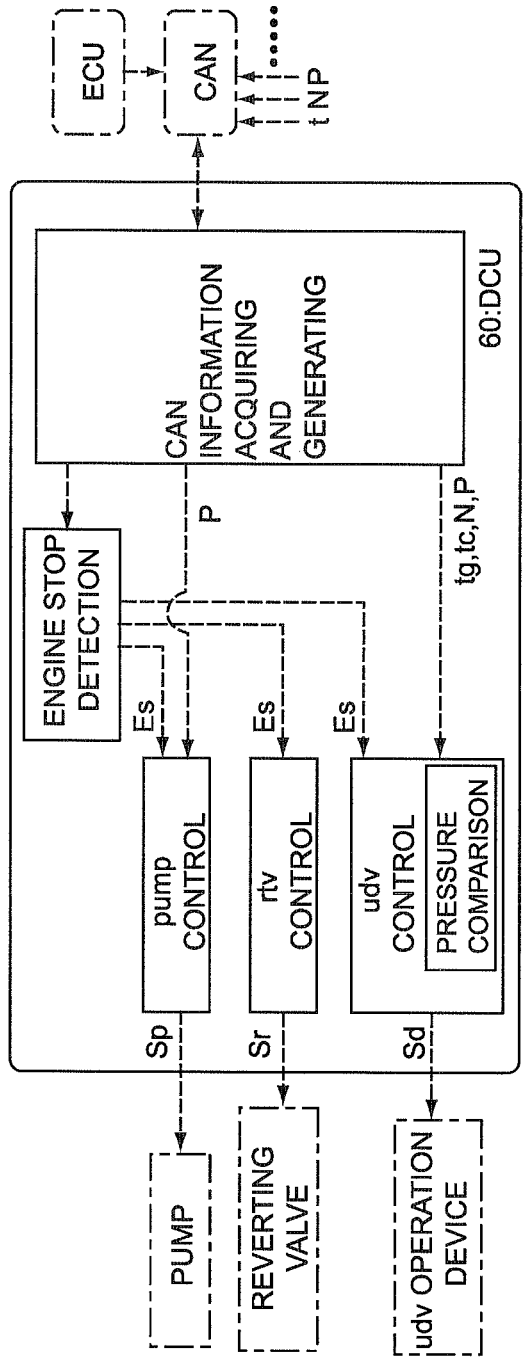
FIG. 2 is a block diagram showing a structural example of a control device (DCU) of a reducing agent supply apparatus that is included in the exhaust gas purification apparatus according to the first embodiment.

FIG. 2 is a diagram that describes a structural example of the DCU 60 provided in the exhaust gas purification apparatus according to the embodiment, and it shows a structural example of portions relating to reducing agent injection control and the reducing agent collection control, the structural example being illustrated by functional blocks.

The DCU 60 is mainly formed of a micro computer with a known structure, and its main elements include a CAN information acquiring and generating portion (referred to as "CAN INFORMATION ACQUIRING AND GENERATING" in FIG. 2), an internal combustion engine stop detection portion (referred to as "ENGINE STOP DETECTION" in FIG. 2), a reverting valve control portion (referred to as "rtv CONTROL" in FIG. 2), a pump control portion (referred to as "pump CONTROL" in FIG. 2), a reducing agent injection valve control portion (referred to as "udv CONTROL" in FIG. 2) etc. In concrete terms, these elements are realized through running a program by the micro computer (not shown in the figures).

The CAN information acquiring and generating portion reads the information existing on the CAN 65, which includes ON and OFF information of a key switch that starts the internal combustion engine, the sensor value of the pressure sensor provided on the second supply path, and information regarding the operating state of the internal combustion engine. The CAN information acquiring and generating portion outputs the information to other respective portions.

Further, the stop detection portion detects a state in which the key switch, which starts the internal combustion engine, is turned off from an on state, and the stop detection portion is used as a trigger to start the reducing agent collection control.

Further, the reverting valve control portion outputs a signal Sr to the reverting valve 71, and switches the flow path of the reducing agent either to the forward direction oriented from the pump to the reducing agent injection valve or to the backward direction oriented from the reducing agent injection valve to the pump. When the reducing agent injection control is performed, the flow path of the reducing agent is switched to the forward direction. On the other hand, when a signal Es, which informs that the key switch has been turned off from the on state, is transmitted from the stop detection portion, the flow path of the reducing agent is switched to the backward direction.

In addition, when the pump control portion performs the reducing agent injection control, the pump control portion continuously reads information regarding a sensor value P of the pressure sensor, which is output from the CAN information acquiring and generating portion, and feedback controls the pump 41 by outputting a control signal Sp to maintain the sensor value P of the pressure sensor at a preset value. For example, in a case in which the pump is an electrically powered pump, when the sensor value P of the pressure sensor is lower than the preset value, in order to increase the pressure, the pump control portion performs control of the electrically powered pump to make a drive duty ratio bigger. In contrast, when the sensor value P of the pressure sensor exceeds the preset value, in order to lower the pressure, the pump control portion performs the control of the electrically powered pump to make the drive duty ratio smaller.

On the other hand, when the pump control portion performs the reducing agent collection control, in a case in which the signal Es, which informs that the key switch has been turned off from the on state, is transmitted from the stop detection portion, the pump 41 is continuously driven after once stopping driving the pump 41, irrespective of the pressure value inside the second supply path.

Further, when the reducing agent injection valve control portion performs the reducing agent injection control, the reducing agent injection valve control portion reads information that is output from the CAN information acquiring and generating portion, including an exhaust gas temperature tg, a reducing catalyst temperature tc, information regarding a $NO_x$ concentration N on the downstream side of the reducing catalyst, and further the information regarding the operating state of the internal combustion engine etc. The reducing agent injection valve control portion generates a control signal Sd to inject a necessary amount of the reducing agent from the reducing agent injection valve to reduce the $NO_x$ contained in the exhaust gas. The control signal Sd is output to the reducing agent injection valve operation device 67 that operates the reducing agent injection valve.

Namely, the reducing agent injection control is performed by the exhaust gas purification apparatus according to the embodiment as described below.

When the internal combustion engine is operated, the reducing agent inside the storage tank is pumped up by the pump and pressure fed to the reducing agent injection valve. At this time, the pressure of the pressure fed reducing agent (the sensor value P of the pressure sensor) is maintained at a constant value through the feedback control of the pump and through the pressure control valve, the reducing agent being in a state in which it is ready to be injected when the reducing agent injection valve is opened.

Here, the reducing agent injection valve control portion of the DCU 60 determines an amount of the reducing agent that should be injected as described above, and it generates the control signal Sd corresponding to the amount of the reducing agent and outputs the control signal Sd to the reducing agent injection valve operation device 67. The reducing agent injection valve operation device 67 performs energization control of the reducing agent injection valve based on the transmitted control signal Sd, and the appropriate amount of the reducing agent is injected into the exhaust gas passageway. The reducing agent injected into the exhaust gas passageway inflows into the reducing catalyst with the reducing agent mixed in the exhaust gas, and the reducing agent is used in a reduction reaction of the $NO_x$ contained in the exhaust gas.

On the other hand, when the reducing agent injection valve control portion according to the embodiment performs the reducing agent collection control, in a case in which the signal Es, which informs that the key switch has been turned off from the on state, is transmitted from the stop detection portion, the reducing agent injection valve control portion outputs a signal to the reducing agent injection valve operation device 67 to fully close the reducing agent injection valve. Further, after the reducing agent injection valve is once fully closed, the reducing agent injection valve control portion, using a portion that compares pressures, compares the sensor value P of the pressure sensor that is output from the CAN information acquiring and generating portion with a preset standard value P0, and the reducing agent injection valve control portion outputs a signal to the reducing agent injection valve operation device 67 to cause the reducing agent injection valve to be fully opened when the sensor value P of the pressure sensor becomes equal to or less than the standard value P0.

Namely, in a state in which the internal combustion engine is stopped and the pump is being driven, when the flow path of the reducing agent is switched by the reverting valve to the backward direction oriented from the reducing agent injection valve to the pump, the reducing agent injection valve is controlled to cause a state in which the reducing agent injection valve is fully closed. After that, as time elapses, when the sensor value P of the pressure sensor provided on the second supply path becomes equal to or less than the standard value P0, the reducing agent injection valve is controlled to cause a state in which the reducing agent injection valve is opened. In this way, when the reducing agent collection control is performed, since a timing at which the reducing agent injection valve is opened is delayed to be after a start timing of the collection operation, the reducing agent injection valve is opened in a state in which the pressure inside the second supply path is sufficiently lowered. Thus, leakage of the reducing agent into the exhaust gas passageway is prevented.

It is preferable for a standard pressure value, at which the timing of opening the reducing agent injection valve by the reducing agent injection valve control portion is determined, to be, for example, within a range between 100 hPa and atmospheric pressure. This is because, if the standard pressure value is less than 100 hPa, it takes time for the pressure value to become equal to or less than the standard value, and there is a possibility that a termination timing of the reducing agent collection control may be delayed. On the other hand, if the standard pressure value exceeds the atmospheric pressure, due to relationships with pressure inside the exhaust gas passageway and a flow speed of the exhaust gas, there is a possibility that the reducing agent may leak into the exhaust gas passageway.

Therefore, it is preferable to set the standard pressure value, at which the timing of opening the reducing agent injection valve is determined, at a value within a range between 200 hPa and the atmospheric pressure minus 100 hPa, and more preferably, at a value within a range between 300 hPa and the atmospheric pressure minus 200 hPa.

3. Reducing Agent Collection Method

Figure 3:
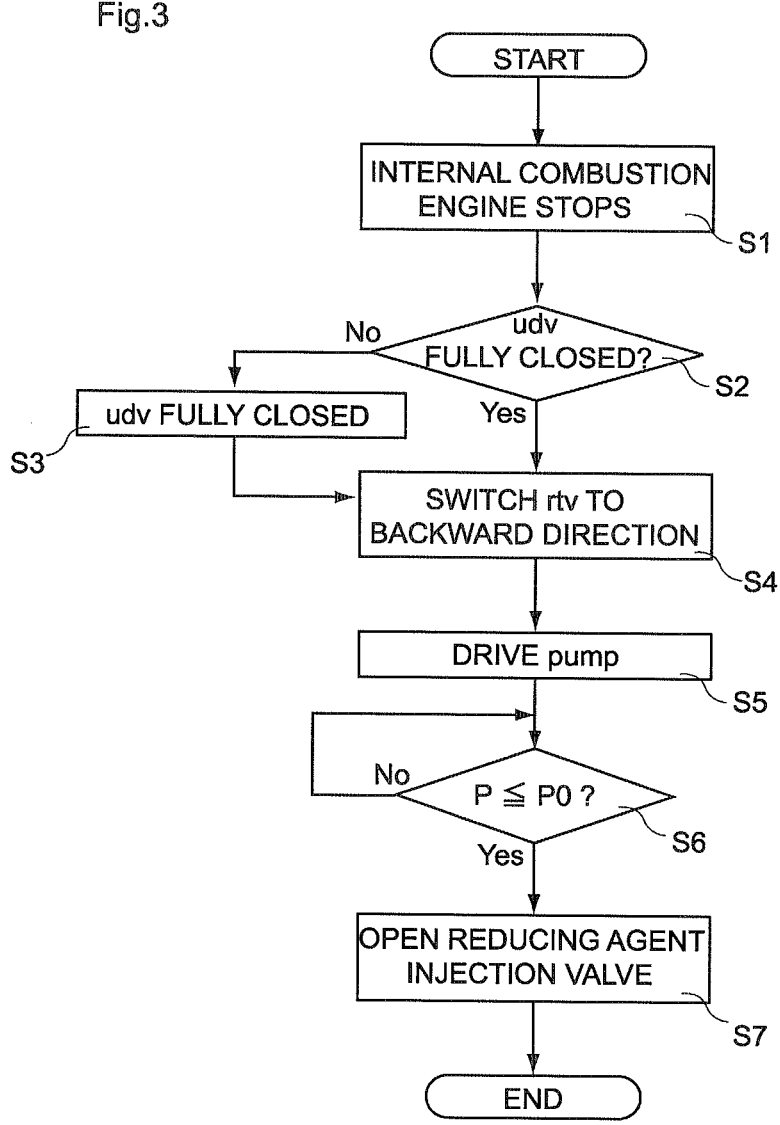
FIG. 3 is a flow chart showing an example of reducing agent collection control that is performed by the exhaust gas purification apparatus according to the first embodiment.

Next, a specific example of the reducing agent collection method using the control device (DCU) 60 of the reducing agent supply apparatus provided in the exhaust gas purification apparatus according to the embodiment is described with reference to a flow in FIG. 3 and a timing chart in FIG. 4.

Figure 4:
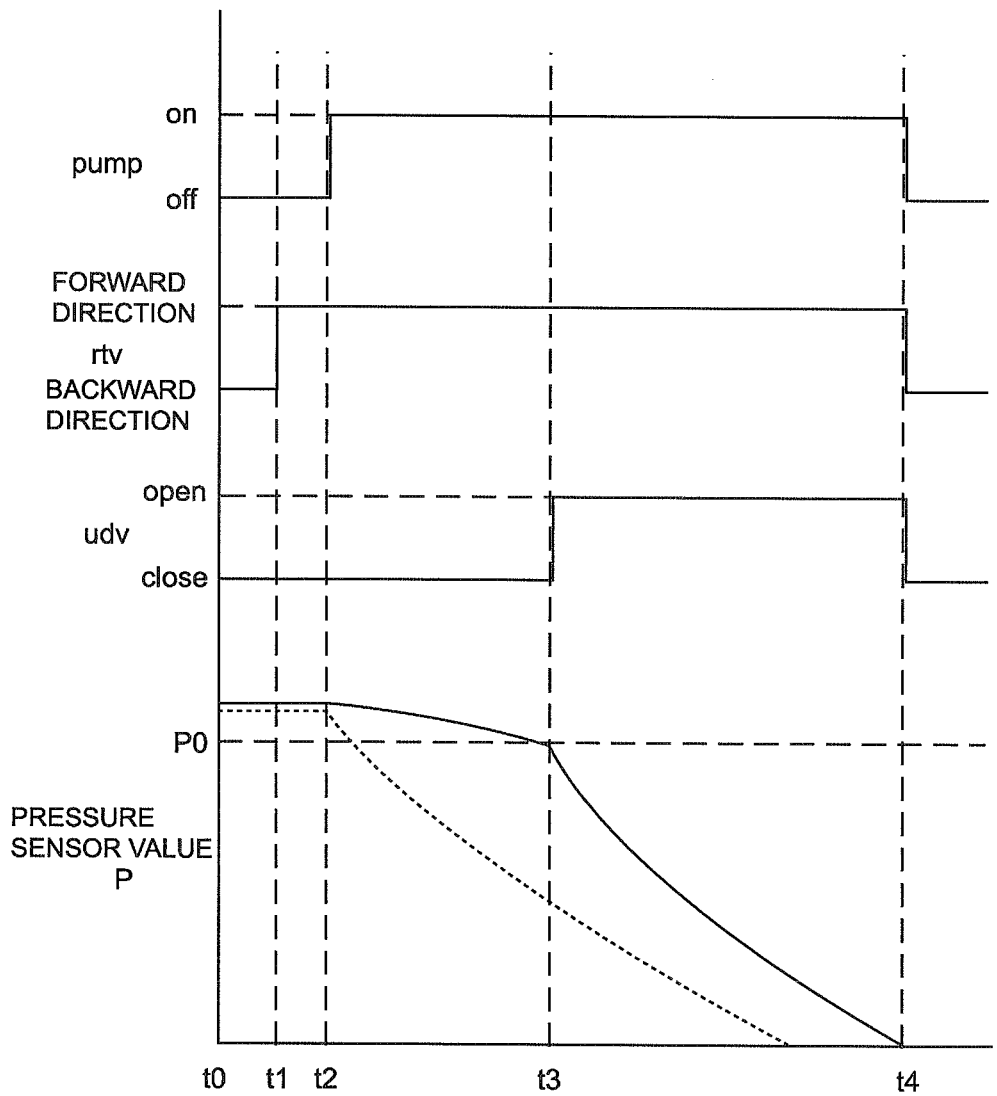
FIG. 4 is a timing chart showing an example of the reducing agent collection control that is performed by the exhaust gas purification apparatus according to the first embodiment.

First, at step S1, after a start, when it is detected that the key switch of the internal combustion engine is turned off from the on state, the process advances to step S2, and it is determined whether or not the reducing agent injection valve udv is fully closed (t0 in FIG. 4). When the reducing agent injection valve udv is fully closed, the process directly advances to step S4. On the other hand, when the reducing agent injection valve udv is open, the process advances to step S4 after the reducing agent injection valve udv is fully closed at step S3.

At step S4 which is advanced in a state in which the reducing agent injection valve udv is fully closed, the flow path of the reducing agent is switched by the reverting valve rtv to the backward direction oriented from the reducing agent injection valve udv to the storage tank (t1 in FIG. 4). Next, at step S5, the pump pump is driven at a predetermined output (t2 in FIG. 4). In this state, the reducing agent remaining inside the second supply path is sucked up by a driving force of the pump pump, and the pressure inside the second supply path starts to be lowered.

Note that step S4, in which the flow path of the reducing agent is switched by the reverting valve rtv to the backward direction, and step S5, in which the pump pump starts being driven, may be performed in reverse order.

Next, the process advances to step S6, the sensor value P of the pressure sensor provided on the second supply path is compared with the standard value P0, and it is determined whether or not the sensor value P of the pressure sensor is equal to or less than the standard value PO, Step 6 is repeated until the sensor value P of the pressure sensor becomes equal to or less than the standard value P0, and when the sensor value P becomes equal to or less than the standard value P0, the process advances to step S7, and the reducing agent injection valve udv is opened (t3 in FIG. 4).

At this time, the reducing agent injection valve udv may be maintained in an open state, but preferably, the reducing agent injection valve udv is opened intermittently. When the reducing agent injection valve udv is opened intermittently, the reducing agent injection valve udv is closed intermittently. Hence, lowering the pressure inside the second supply path and collecting the reducing agent while the reducing agent injection valve udv is open are repeated alternately. Thus, the reducing agent is collected efficiently while the reducing agent injection valve udv is open. Thus, leakage of the reducing agent into the exhaust gas passageway is reliably prevented.

Further, since the pressure inside the second supply path is lowered at this point in time, opening the reducing agent injection valve udv does not cause the reducing agent inside the second supply path to leak into the exhaust gas passageway. Then, since a gas phase is introduced from a side of the reducing agent injection valve udv, the reducing agent inside the second supply path is smoothly collected into the storage tank while being replaced into the gas phase, and the reducing agent collection control is completed (t4 in FIG. 4).

By collecting the reducing agent into the storage tank in this way, leakage of the reducing agent into the exhaust gas passageway is prevented. As a result, crystallization of ammonia on the inner surface of the exhaust gas passageway and damage to the reducing catalyst caused by being made wet by the reducing agent are prevented, and a consumption amount of the reducing agent is curbed.

In FIG. 4, when the reducing agent injection valve udv is opened at the same time as the pump pump to collect the reducing agent starts being driven, a change in the sensor value of the pressure sensor is shown by a dotted line. When the reducing agent injection valve udv is opened at the same time as the pump starts being driven, the reducing agent is likely to leak into the exhaust gas passageway due to residual pressure, since the sensor value P of the pressure sensor is kept high at the point (t2). Therefore, as described above, in order to prevent leakage of the reducing agent, it is effective to delay the timing of opening the reducing agent injection valve udv for a predetermined time period after the pump starts being driven.

[Second Embodiment]

While the exhaust gas purification apparatus of the first embodiment uses the pressure value of the second supply path as a material to determine the timing of opening the reducing agent injection valve, an exhaust gas purification apparatus according to a second embodiment of the invention determines the timing of opening the reducing agent injection valve based on an elapsed time period from the start of the collection control. In this regard, the second embodiment is different from the exhaust gas purification apparatus according to the first embodiment. Explanations regarding common points with the first embodiment will be omitted, and different points from the first embodiment will be mainly explained below.

1. Control Device (DCU) of Reducing Agent Injection Valve

Figure 5:
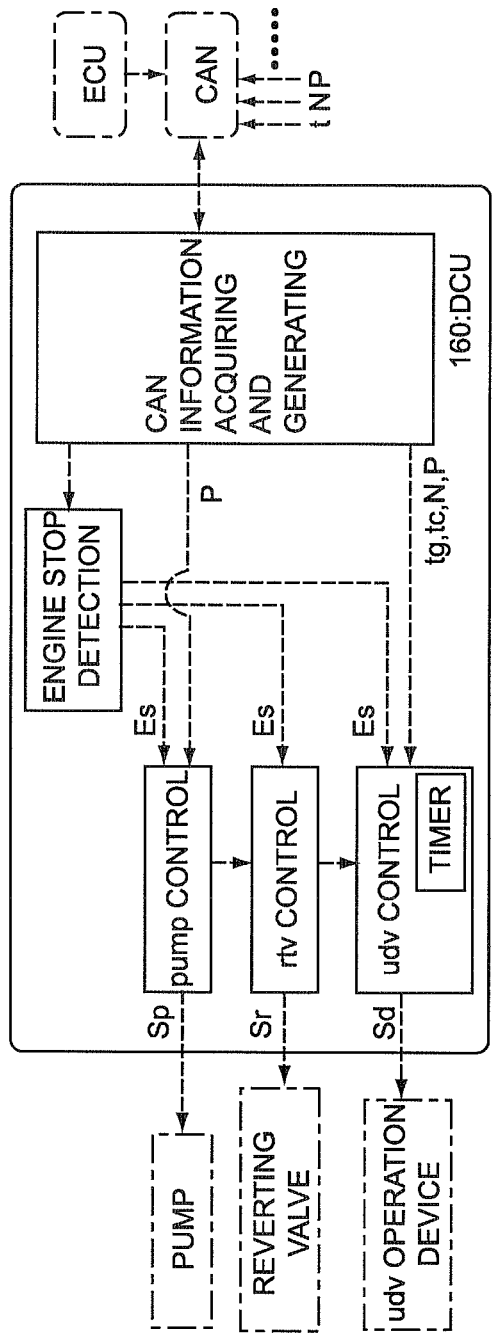
FIG. 5 is a block diagram showing a structural example of a control device (DCU) of the reducing agent supply apparatus that is included in an exhaust gas purification apparatus according to a second embodiment.

FIG. 5 is a diagram showing a structure of a DCU 160 provided in the exhaust gas purification apparatus according to the embodiment. The DCU 160 has a structure in which the elapsed time period is timed by a timer from a point of time at which the reducing agent collection control is started. In an example in FIG. 5, the timer is provided in the reducing agent injection valve control portion, but the timer may be provided in a portion other than the reducing agent injection valve.

When the DCU 160 of the reducing agent injection valve control portion according to the embodiment performs the reducing agent collection control, similarly to the first embodiment, when the signal Es, which informs that the key switch has been turned off from the on state, is transmitted from the stop detection portion, the reducing agent injection valve control portion outputs the signal Sd to the reducing agent injection valve operation device to fully close the reducing agent injection valve. At this time, simultaneously, a timer count is started, and after that, when a timer value T passes a predetermined standard time period T0, the reducing agent injection valve control portion transmits the signal Sd to the reducing agent injection valve operation device 67 to fully open the reducing agent injection valve. When the reducing agent collection control is performed, since the timing at which the reducing agent injection valve is opened is delayed to be after the start timing of the collection operation, the reducing agent injection valve is opened in a state in which the pressure inside the second supply path is sufficiently lowered, and thus, leakage of the reducing agent into the exhaust gas passageway is prevented.

A timer value used for determining the timing of opening the reducing agent injection valve varies depending on a length and a diameter of the second supply path and a pressure feed amount of the pump. However, for example, when the length of the second supply path is from 1 m to 10 m, the diameter is 6 mm, and the pressure feed amount is 7 ml/s, it is preferable for the timer value to be set at a value within a range from 5 to 45 seconds. This is because if the timer value is less than 5 seconds, the pressure inside the second supply path is not sufficiently lowered, and, due to the relationships with the pressure inside the exhaust gas passageway and the flow speed of the exhaust gas, the reducing agent sometimes leaks into the exhaust gas passageway. On the other hand, if the timer value exceeds 45 seconds, the timing of opening the reducing agent injection valve is significantly delayed, and it sometimes takes excessive time for the collection of the reducing agent to be completed. Therefore, given the above-described conditions of the second supply path and the pressure feed amount of the pump, it is more preferable for the timer value to be set at a value within a range from 10 to 40 seconds, and even more preferably, to be set at a value within a range from 15 to 35 seconds.

2. Reducing Agent Collection Method

Figure 6:
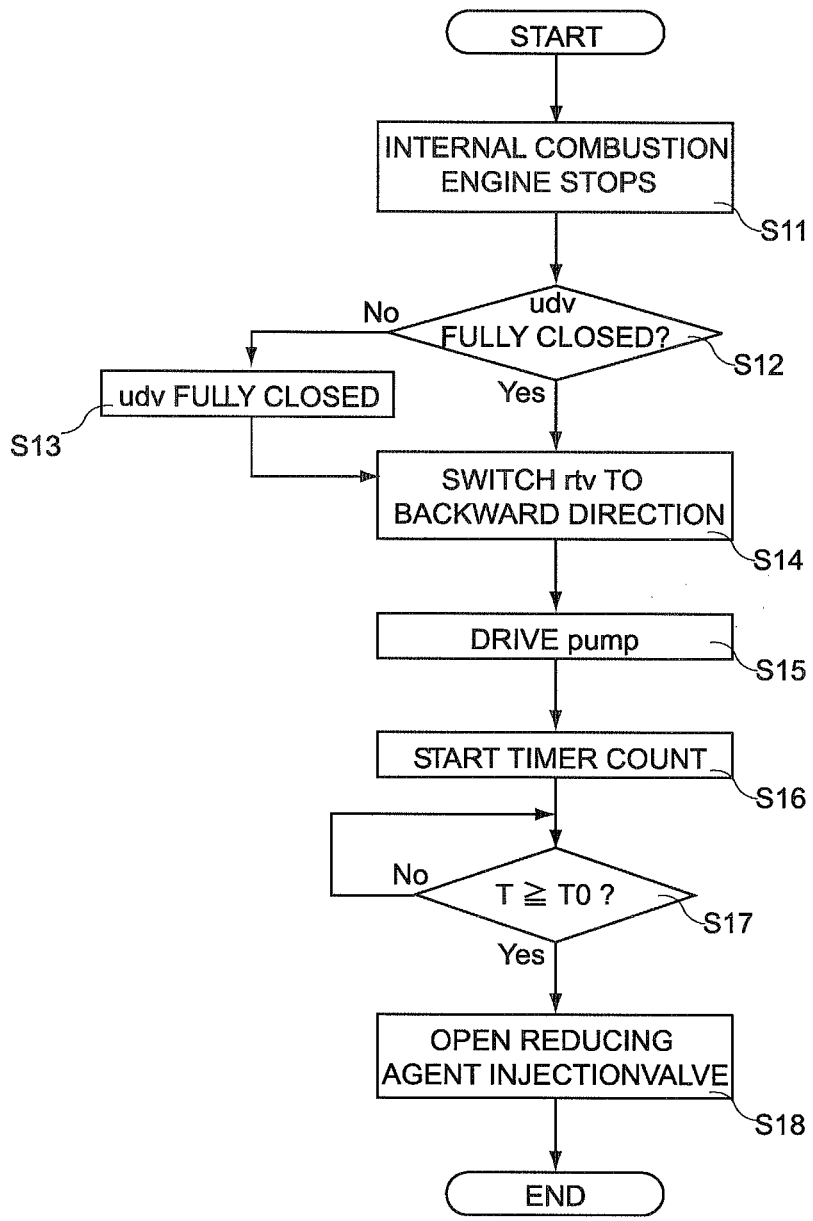
FIG. 6 is a flow chart showing an example of reducing agent collection control that is performed by the exhaust gas purification apparatus according to the second embodiment.

Next, a specific example of the reducing agent collection method using the DCU 160 provided in the exhaust gas purification apparatus according to the embodiment is described with reference to a flow in FIG. 6 and a timing chart in FIG. 7.

Figure 7:
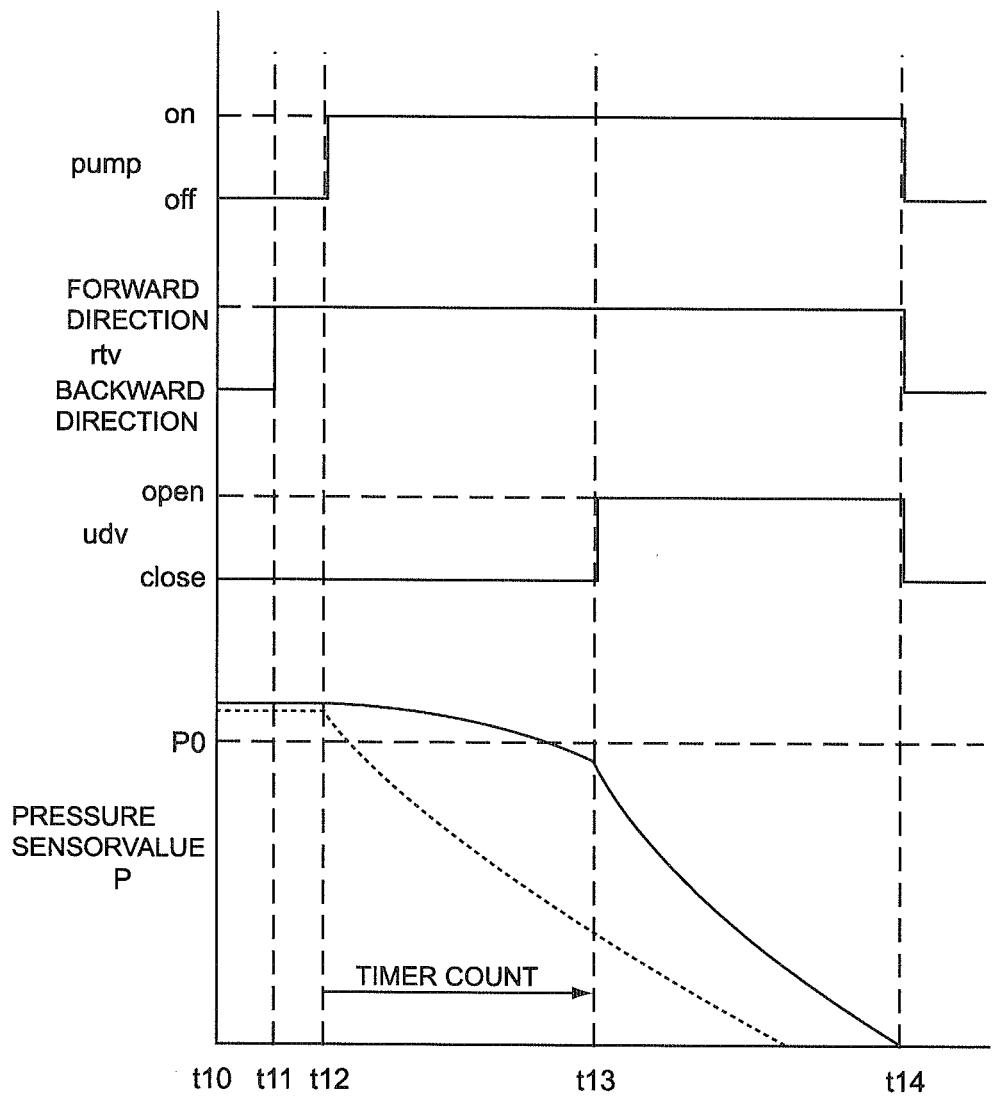
FIG. 7 is a timing chart showing an example of the reducing agent collection control that is performed by the exhaust gas purification apparatus according to the second embodiment.
Figure 8:
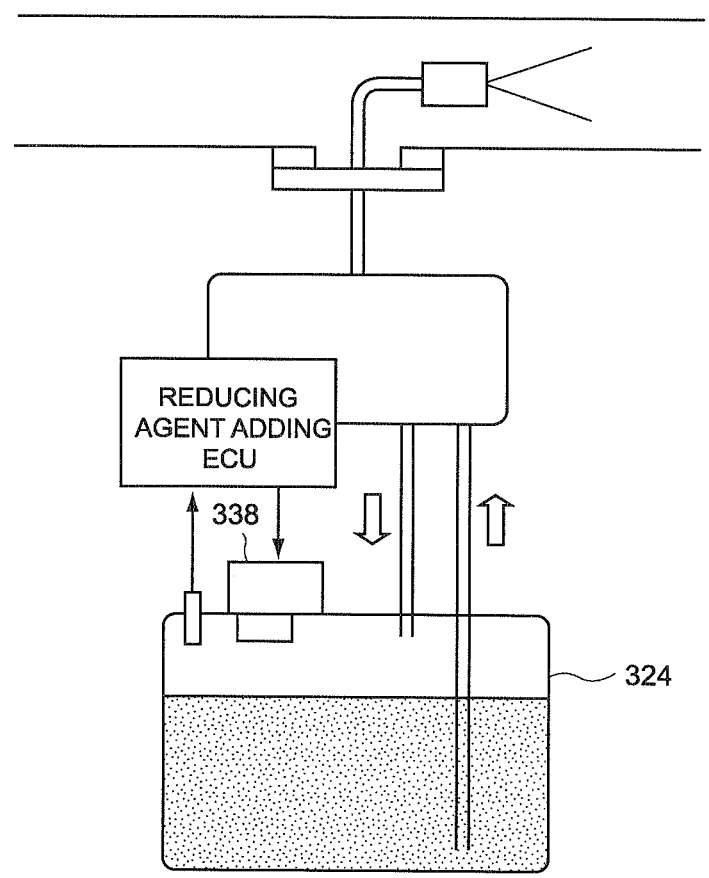
FIG. 8 is a diagram showing a structural example of a known exhaust gas purification apparatus.

After a start, similarly to the steps of the reducing agent collection method described in the first embodiment, when it is detected, at step S11, that the key switch of the internal combustion engine is turned off from the on state, it is determined, at step S12, whether or not the reducing agent injection valve udv is fully closed (t10 in FIG. 7). When the reducing agent injection valve udv is fully closed, the process directly advances to step S14. On the other hand, when the reducing agent injection valve udv is open, the process advances to step S14 only after the reducing agent injection valve udv is fully closed at step S13.

Next, at step S14, after the flow path of the reducing agent is switched to the backward direction by the reverting valve rtv (t11 in FIG. 7), at step S15, the pump pump starts being driven (t12 in FIG. 7). In the embodiment, the process advances to step S16 at this point in time, and the timer count is started.

After that, the process advances to step S17, and it is determined whether or not the timer value T has passed the predetermined standard time period T0. Step S17 is repeated until the timer value T passes the timer value T0, and when the standard time period has elapsed, the process advances to step S18, and the reducing agent injection valve udv is opened (t13 in FIG. 7). Since the pressure inside the second supply path is sufficiently lowered at this point in time (equal to or less than P0), opening the reducing agent injection valve udv does not cause the reducing agent inside the second supply path to leak into the exhaust gas passageway. Then, since the gas phase is introduced from the side of the reducing agent injection valve udv, the reducing agent inside the second supply path is smoothly collected into the storage tank while being replaced into the gas phase, and the reducing agent collection control is completed (t14 in FIG. 7).

By collecting the reducing agent into the storage tank in this way, leakage of the reducing agent into the exhaust gas passageway is prevented. As a result, the crystallization of ammonia on the inner surface of the exhaust gas passageway and damage to the reducing catalyst caused by being made wet by the reducing agent are prevented, and the consumption amount of the reducing agent is curbed.

Note that, as the material to determine the timing of opening the reducing agent injection valve, although the pressure inside the second supply path is used in the first embodiment and the elapsed time period from the start of the reducing agent collection control is used in the second embodiment, these elements can be adopted in combination. In concrete terms, by monitoring both the sensor value of the pressure sensor and the timer value, the reducing agent injection valve may be adapted to be opened at a time point at whichever value reaches the standard pressure value P0 or the standard time period T0 earlier.

The invention claimed is:

1. A reducing agent collection method for collecting a reducing agent inside reducing agent supply paths into a storage tank when an internal combustion engine is stopped in an exhaust gas purification apparatus that adds the reducing agent to an exhaust gas upstream side of a reducing catalyst disposed inside an exhaust gas passageway of an internal combustion engine and reduces and purifies nitrogen oxides contained in exhaust gas using the reducing catalyst, the reducing agent collection method comprising the steps of:

closing the reducing agent injection valve in response to a stopping of the internal combustion engine when the reducing agent injection valve is opened when the internal combustion engine stops;

starting operation of a reducing agent collecting means with the reducing agent injection valve closed in response to the stopping of the internal combustion engine, wherein the reducing agent collecting means collects reducing agent inside the reducing agent supply paths into the storage tank; and automatically opening the reducing agent injection valve in response to an expiration of a predetermined time period after the operation of the reducing agent collecting means is started.

2. The reducing agent collection method according to claim 1, wherein the reducing agent injection valve is opened when pressure inside the reducing agent supply paths becomes equal to or less than a predetermined standard value.

3. The reducing agent collection method according to claim 1, wherein the reducing agent injection valve is opened when an elapsed time period after the collection of the reducing agent starts passes a preset standard time period.

4. The reducing agent collection method according to claim 1, wherein the reducing agent injection valve is opened intermittently when a valve opening operation of the reducing agent injection valve is performed after the predetermined time period elapses.

5. The reducing agent collection method according to claim 2, wherein the reducing agent injection valve is opened intermittently when a valve opening operation of the reducing agent injection valve is performed after the predetermined time period elapses.

6. The reducing agent collection method according to claim 3, wherein the reducing agent injection valve is opened intermittently when a valve opening operation of the reducing agent injection valve is performed after the predetermined time period elapses.

7. The reducing agent collection method according to claim 1, wherein the predetermined time period is set to make the pressure inside the reducing agent supply paths become equal to or less than a predetermined standard value.

8. The reducing agent collection method according to claim 1, wherein the act of starting operation of the reducing agent collecting means includes opening a reverting valve between the reducing agent supply paths and the storage tank, and activating a pump which pumps reducing agent from the reducing agent supply paths into the storage tank.

* * * * *